UNITED STATES PATENT OFFICE.

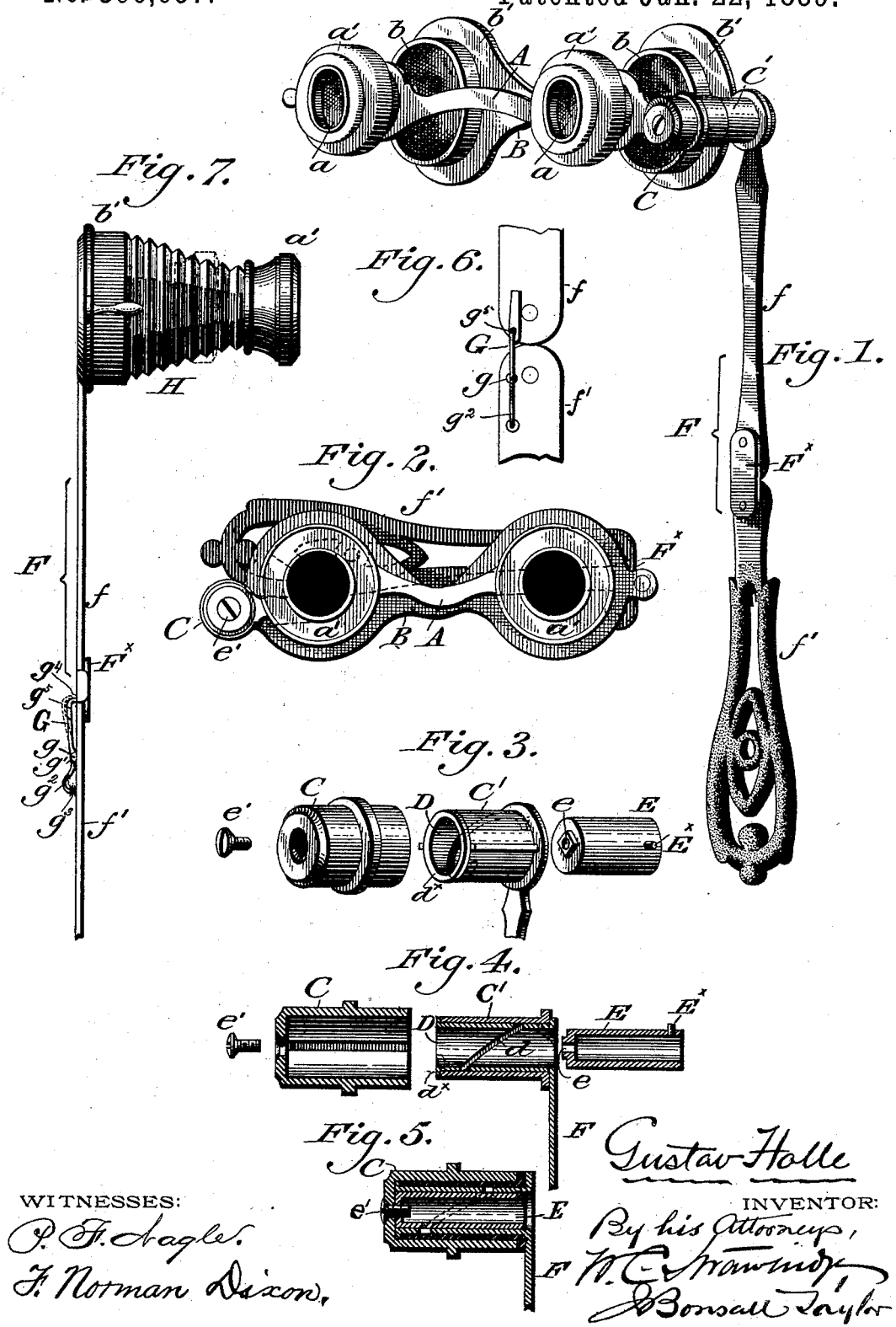

GUSTAV HOLLE, OF PHILADELPHIA, PENNSYLVANIA.

OPERA-GLASS.

SPECIFICATION forming part of Letters Patent No. 396,657, dated January 22, 1889.

Application filed February 1, 1888. Serial No. 262,647. (Model.)

*To all whom it may concern:*

Be it known that I, GUSTAV HOLLE, a subject of the Emperor of Germany, residing in the city and county of Philadelphia, and State of Pennsylvania, have invented an Improvement in Opera Glasses, of which the following is a specification.

It is the object of my invention to construct an opera glass which may, for convenience in carrying, be reduced to small compass, to equip it with a handle which may be folded up when not in use, and to attach such handle to the glass in such manner and by such means that the folding or unfolding of the handle will cause the closing or opening of the glasses.

A pair of opera glasses embodying my invention, in which the handle when extended for use, depends from the side of, as distinguished from between, the glasses, is represented in the accompanying drawings and herein described, the particular subject matter claimed as novel, being hereinafter definitely specified.

In the drawings, Figure 1 is a perspective view of a pair of opera glasses in proper adjustment for actual use. Fig. 2 is a front view of the same, shown compacted or folded for carrying. Fig. 3 is a perspective view of the thimble, guide cylinder, slot cylinder, and stud barrel, detached. Fig. 4 is a longitudinal vertical sectional view of the same parts. Fig. 5 is a vertical sectional view of the same parts when nested, or in the position they occupy when the glass to which they are applied is closed. Fig. 6 is an elevational detail of the joint which is situated midway of the handle of the device. Fig. 7 is a side elevation of a pair of opera glasses embodying my invention and provided with compressible tubes.

Similar letters of reference indicate corresponding parts.

In the drawings, $a\ a$ are the eye lenses of the glass, the same being set in frames $a'\ a'$, which are in turn mounted in the yoke A. At one end the yoke A is provided with an extension, within which is mounted or as a part of which is formed, a thimble C, the bore of which is at right angles to the plane of the yoke.

$b\ b$ are the object lenses of the glass, the same being set in frames $b'\ b'$ which are in turn mounted in the yoke B. The yoke B is provided with an extension, at the same end as and similar to the extension of the yoke A, and to this extension is attached, or as a part of it is formed, what I term a guide cylinder C', the same being conformed to snugly fit within the bore of the thimble C, to slide longitudinally therein in the approach or recession of the eye and object lens yokes, and which is keyed or feathered within said thimble to prevent any rotative movement with reference thereto.

The thimble C and guide cylinder C' serve to connect and maintain the yokes A and B, in proper relationship the one to the other, and serve also to contain the instrumentalities whereby the separation or approach of said yokes is effected, and, not being situated at a point between the two yokes, they, moreover, permit of the close approach of the latter one to the other, whereby the whole device when not in use occupies but small space, as hereinbefore stated.

D is a slot cylinder fitting within the bore of the guide cylinder, which at its inner end is provided with an angular flange $d^\times$ bearing against the lips of the bore of the inner end of the guide cylinder,—and to which at its outer end is attached the depending handle F, which incidentally serves as a stop or flange to bear against the outer end of the guide cylinder, so that longitudinal movement of the slot cylinder in either direction compels the similar movement of the guide cylinder. The slot cylinder D is provided with a helical or spiral slot $d$, conveniently of the curvature and pitch shown in the drawings.

E is a stud barrel, the same being a hollow cylindric device of external diameter equal to the internal diameter of the slot cylinder D within which it lies. One end of the barrel is closed and provided with a screw threaded orifice $e$. A screw $e'$ passes through a screw threaded orifice in the closed end of the thimble C, and then through the orifice $e$ in the barrel E, whereby said barrel is held tightly and rigidly in position against the inner end of and concentrically with respect to the thimble C.

Incidentally it is to be remarked that the object of making the barrel hollow is for lightness merely, its bore subserving no mechanical function. The barrel E at its inner end is externally provided with a stud $E^x$ which is entered into the helical slot $d$ within the cylinder D. It will now be obvious that the thimble C, the eye lens yoke, and the barrel cylinder E, are connected and move as a rigid whole, and constitute one member of the connecting and adjusting device of the opera glass, and that the guide cylinder, the object lens yoke, and the slot cylinder, are likewise connected, and constitute the other member of the connecting and adjusting device of the opera glass.

F is, as stated, a depending handle, the upper end of which preferably encircles and is rigidly connected to the slot cylinder. It is of any convenient length, and is preferably composed of two members, $f$ and $f'$, which, at their meeting ends are hinged in any suitable manner. I find it convenient to round off said meeting ends as shown in Fig. 6, and by pivots passing through said ends at points concentric with respect to the rounded off portion, connect them together by a link $F^x$.

Rigidity may be imparted to the joint thus formed in any convenient manner, but I prefer to employ a latch of the construction shown, in which G is a steel hook mounted on a pivot $g$ supported in ears $g'$ on one member of the handle; the rear end of the hook is formed into a heel $g^2$, beneath which is a spiral spring $g^3$. The claw or front end $g^5$ of the hook extends over to the other member of the handle and engages in a seat $g^4$ therein.

The operation of my device is obvious; assuming the parts in the position represented in Fig. 2, to open them to the position shown in Fig. 1, the lower member of the handle is straightened out with respect to its other member, and the whole handle is swung around to the extent of three quarters of a complete circle so that it occupies the position shown in Fig. 1. In the swinging of the handle the slot cylinder is also turned, and in its rotation the edge of the slot acting against the stud after the manner of an inclined plane, causes the movement of the thimble and barrel and their connected yoke in one direction, and the movement of the guide cylinder and slot cylinder and their connected yoke in the other direction.

To close the glasses the operation above described is simply reversed.

It will be obvious that ordinary rigid forms of tubes are not applicable in connection with my invention, and in Fig. 7 I illustrate a bellows tube of the form which I prefer to employ in connection with the described form of opera glass. This tube is lettered H, is in cross section preferably of polygonal contour, and has its walls circumferentially creased, or formed of material in which permanent bellows-like folds are formed, so that it is adapted to be compacted within very small compass and is yet capable of being extended for use.

Having thus described my invention, I claim and desire to secure by Letters Patent:—

1. An opera glass provided with an eye lens yoke and an object lens yoke, a telescopically related extensible device the parts of which are secured to the extremities of the yokes for adjustably connecting said yokes, and capable of sufficient contraction to bring the lens yokes into immediate proximity, and suitable mechanism for causing the extension or contraction of said extensible device, substantially as set forth.

2. An opera glass provided with an eye lens yoke and an object lens yoke adapted to approach and lie in immediate proximity to each other, connective devices for adjustably connecting said yokes, a stud mounted upon a connection of one of said yokes and working in a spiral slot formed in a rotatable cylinder mounted in connection with the other of said yokes, substantially as set forth.

3. An opera glass provided with an eye lens yoke and an object lens yoke adapted to approach and lie in immediate proximity to each other, a telescopically related extensible device for adjustably connecting said yokes, suitable mechanism for causing the extension or contraction of said connecting device, and a depending handle hingedly connected to a connection of one of said yokes, substantially as set forth.

4. An opera glass provided with an eye lens yoke and an object lens yoke adapted to approach and lie in immediate proximity to each other, connective devices for adjustably connecting said yokes, a rotatable spirally slotted cylinder mounted in connection with one of said yokes, a fixed stud mounted in connection with the other of said yokes, and a depending folding handle rigidly attached to said rotatable slotted cylinder, substantially as set forth.

5. An opera glass provided with an eye lens yoke and an object lens yoke, a telescopically related extensible connecting device, exterior to the space between said two yokes for adjustably connecting said yokes, a rotatable spirally slotted cylinder mounted within said extensible device and in connection with one of said yokes, a fixed stud mounted within said extensible device in connection with the other of said yokes and engaged with the spiral slot of said cylinder, and a depending handle rigidly attached to said rotatable slotted cylinder, substantially as set forth.

6. An opera glass provided with an eye lens yoke and an object lens yoke, a telescopically related extensible connecting device exterior to the space between said two yokes, for adjustably connecting said yokes, a rotatable spirally slotted cylinder mounted within said extensible device and in connection with one of said yokes, a fixed stud mounted within said extensible device in connection with the other of said yokes, and engaged with the spiral slot of said cylinder, and a sectional latch provided handle attached to said rotatable slotted cylinder, substantially as set forth.

In testimony that I claim the foregoing as my invention I have hereunto signed my name this 17th day of January, A. D. 1888.

GUSTAV HOLLE.

In presence of—
J. BONSALL TAYLOR,
F. NORMAN DIXON.